United States Patent
Sündermann

[19]

[11] Patent Number: 5,807,025
[45] Date of Patent: Sep. 15, 1998

[54] PROCESS FOR LINING A CHANNEL AND FITTING AND WITHDRAWAL SLIDE FOR IMPLEMENTING IT

[75] Inventor: Franz Sündermann, Ruprechtshofen, Austria

[73] Assignee: Klug Kanal-, Leitungs- und Umweltsanierungs-Gesellschaft M.B.H, Ruprechtshofen, Austria

[21] Appl. No.: 553,525

[22] PCT Filed: May 3, 1994

[86] PCT No.: PCT/AT94/00059

§ 371 Date: Oct. 30, 1995

§ 102(e) Date: Oct. 30, 1995

[87] PCT Pub. No.: WO94/25695

PCT Pub. Date: Nov. 10, 1994

[30] Foreign Application Priority Data

May 5, 1993 [AT] Austria .................................. 885/93

[51] Int. Cl.⁶ ......................................................... F16L 1/00
[52] U.S. Cl. ............................. 405/154; 138/98; 405/146
[58] Field of Search ................................ 405/146, 150.1, 405/154, 184, 147; 138/97, 98

[56] References Cited

U.S. PATENT DOCUMENTS

| 244,752 | 7/1881 | Hunter et al. .................... 405/154 X |
| 1,716,125 | 6/1929 | Hackley ............................ 405/150.1 |
| 1,751,147 | 3/1930 | Hackley ............................ 405/146 X |
| 2,995,901 | 8/1961 | Kemper ............................ 405/146 X |
| 3,640,076 | 2/1972 | Rees et al. ...................... 405/146 |
| 4,218,044 | 8/1980 | Ikhsanov et al. ................. 405/154 X |
| 4,257,717 | 3/1981 | Ege .................................. 405/154 |
| 4,284,385 | 8/1981 | Lively et al. .................... 405/154 X |
| 4,371,569 | 2/1983 | Muta et al. ....................... 427/230 |
| 4,407,609 | 10/1983 | Cerutti et al. .................. 405/146 |
| 5,139,751 | 8/1992 | Mansfield et al. .............. 405/146 X |
| 5,403,122 | 4/1995 | Granella .......................... 405/154 X |
| 5,427,154 | 6/1995 | Stephens ......................... 405/154 X |

FOREIGN PATENT DOCUMENTS

| 0145266 | 6/1985 | European Pat. Off. ........ B05B 13/06 |
| 0184366 | 6/1986 | European Pat. Off. .......... E03F 3/06 |
| 1232721 | 1/1967 | Germany . |

*Primary Examiner*—Dennis L. Taylor
*Attorney, Agent, or Firm*—Dougherty & Dremann

[57] ABSTRACT

A method of lining a sewer in which an inner pipe is introduced into an existing sewer, and the space between the outer surface of the inner pipe and the inner surface of the sewer is filled with a filler. To introduce the filler into the space, at least one supply duct which preferably is provided with a delivery nozzle is introduced into the sewer until the at least one supply duct extends over the entire longitudinal length of the inner pipe. Subsequently, the at least one supply duct is removed by a withdrawal movement. During the removal of the at least one supply duct, the filler is delivered into the space through the duct or through the delivery nozzle preferably provided on the duct in an amount sufficient to completely fill the space. An introduction and removal slide for carrying out the method comprises two skids interconnected by a web and a fixing means for fixing the at least one supply duct, by means of which the duct is fixable at approximately equal distances from the skids and substantially parallel thereto.

13 Claims, 5 Drawing Sheets

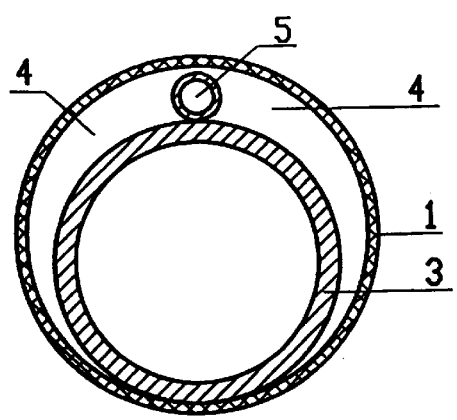
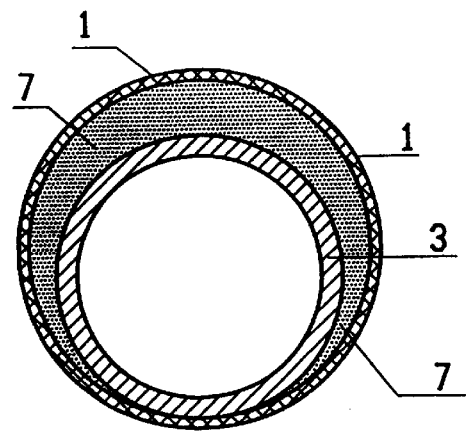
FIG. 5a  FIG. 5b
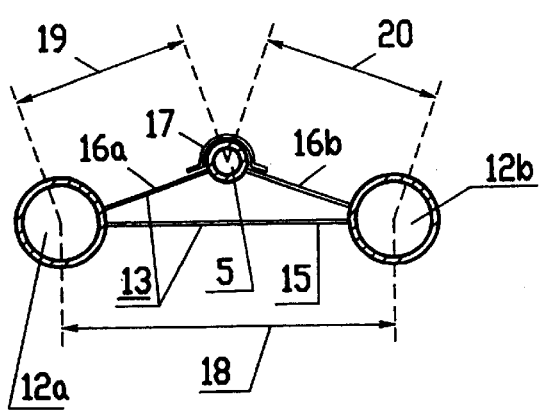
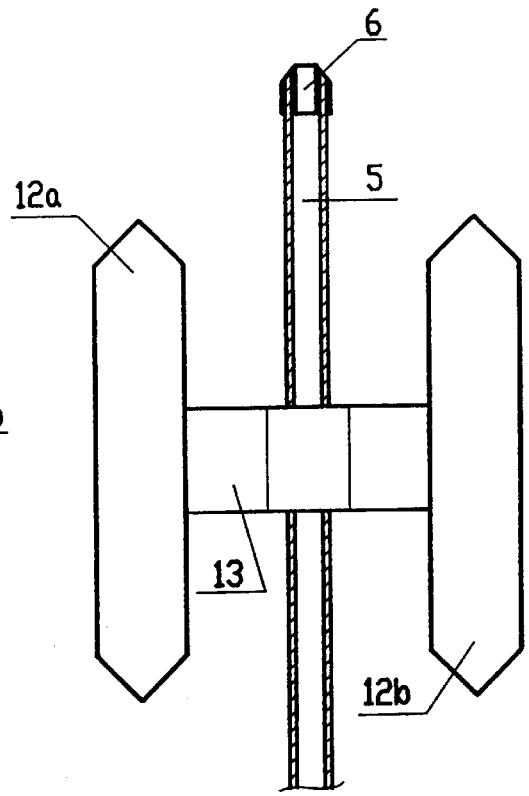
FIG. 6a  FIG. 6b

PROCESS FOR LINING A CHANNEL AND FITTING AND WITHDRAWAL SLIDE FOR IMPLEMENTING IT

The invention relates to a method of lining a sewer, which method comprises introducing an inner pipe lining pipe, liner, or reliner, into an already existing and possibly damaged sewer, and filling the annular space between the outer surface of the inner pipe and the inner surface of the sewer with filler. The invention also relates to an introduction and removal slide usable in implementing this method.

The renovation of damaged, mostly old, sewer pipes of inaccessible cross-section has become a grave concern for operators of sewage pipe networks and increasingly requires ever rising financial and personal expenditures. The substantial lengths of old sewer and drainage ducts, respectively, which are already damaged or which are expected to become damaged shortly pose problems both in terms of drainage technology (cloggings, road cave-ins, etc.) and in terms of environmental technology, because groundwater gets contaminated by emerging waste water. Because of narrow routes and high traffic density, in most cases only underground modes of construction are feasible for the renewal of ducts already present, and the following requirements must be met: no or only little groundwork short construction times, minimal interruptions of the operation of the network, maintenance or improvement of the existing hydraulic conditions and low costs as compared to a new construction carried out in open construction manner.

Among the renovation methods, those methods become increasingly important which re-line the existing, damaged sewer by introducing a new inner pipe into the sewer and filling the annular space remaining between the outer surface of the inner pipe and the inner surface of the sewer with filler. However, particularly if paths of more than ten meters are to be filled, filling of the annular space proves to be difficult. Hitherto, filler has been pushed under pressure into the annular space from one side or flushed in without pressure. Complete filling of the annular space can hardly be guaranteed, and cannot be checked, either.

Departing from this, it is the object of the present invention to provide a method of the initially mentioned type which is distinguished by an easier handling, a complete and checkable filling of the annular space, a large choice of fillers available and shorter filling times required.

The method according to the invention of the initially mentioned type is characterized in that for introducing filler into the said annular space, at least one supply duct which is preferably provided with a delivery nozzle is introduced into this annular space until this at least one supply duct extends over the entire length of the inner pipe, and that subsequently this at least one supply duct is removed by a return movement and during removal of this at least one supply duct filler in an amount sufficient or completely filling the annular space is delivered into the annular space through this at least one supply duct or through the nozzle provided on this at least one supply duct. By this design the above-indicated object can be met well.

As regards the organization of construction sites and the procedure, a suitable embodiment of the method according to the invention is characterized in that at least one supply duct is introduced into the annular space, starting at one end of the inner pipe and extending to the other end of the inner pipe.

Another embodiment of the method according to the invention with which great lengths of the respective sewer sections to be lined can be treated is characterized in that at least one supply duct is introduced from each end of the inner pipe as far as to a site located in the middle region of the longitudinal extension of the inner pipe and from there is returned to its site of introduction.

For introducing the supply duct utilized in the method according to the invention into the sewer, an advantageous embodiment of this method provides for introducing the supply duct to be arranged in the annular space at the outer surface of the inner pipe into the sewer together with the inner pipe. An embodiment of the method according to the invention similarly suitable in terms of introducing the supply duct, in which the introduction of the inner pipe is simpler than in the previously mentioned embodiment insofar as no attention need be paid to the supply duct when the inner pipe is being introduced into the sewer is characterized in that together with the inner pipe, an auxiliary rope is introduced at the outer surface of the inner pipe into the annular space formed in the sewer, whereupon the supply duct is introduced with the auxiliary rope into the annular space. As regards the introduction of the supply duct, a further suitable embodiment of the method according to the invention is characterized in that a guide rope is tensioned along the internal surface of the sewer, and the supply ducts are introduced and removed along the guide rope by suspension means displaceable on the guide rope.

To achieve as stable a mounting as possible of the inner pipe in the sewer to be lined it is advantageous if the inner pipe is arranged on the bottom of the sewer to be lined, and according to an embodiment which has proved particularly suitable in practice, the inner pipe is forced towards the bottom of the sewer in a manner known per se by means of gravity, by filling the inner pipe with water, the annular space thus being sickle-shaped as viewed in cross-section.

As regards the flow of filler into the annular space present between sewer wall and inner pipe it is advantageous if the supply duct and particularly the delivery nozzle, during introduction and particularly during the removal thereof, is guided precisely above the inner pipe and as high as possible in the annular space.

To ensure uniform and complete filling of the annular space with filler it is advantageous if the return speed and/or the material pressure in the supply duct are continuously re-adjusted in accordance with the filler used and the volume of the annular space by aid of a control means arranged on the supply duct, in particular in the vicinity of the delivery nozzle and communicating the filling degree of the annular space so as to ensure complete filling of the annular space. A comparatively simple design of the control means is obtained if a TV camera is used as said control means. A variant thereto is characterized in that at least one sensor, e.g. a humidity sensor, responding to the presence and/or absence of filler is used as said control means.

To obtain a rapid procedure when filling the annular space between the inner surface of the sewer and the inner pipe it is advantageous if the supply duct is designed in the form of two hoses and if a two component material forcibly mixed immediately upstream of the delivery nozzle is used as the filler. In this manner, a two component material can be used which cures rapidly without causing problems when forced pauses occur, since the material components are brought into contact with each other, and thus caused to react, immediately just before the material flows out into the annular space. With such two-component materials also a high degree of expansion and a high strength can be achieved. Very good practical properties of the annular space filling can be obtained if, as said filler, a statically strong, water-displacing, moisture-curing, non-ageing, chemical-resistant and environmentally harmless two-component PU foam is used.

A very stable neutral filling of the annular space which also has a high strength can be achieved if a lightweight concrete is used as said filler. A particularly favorable filling behavior which surely precludes the formation of air-filled pockets is achieved if a grout made up of water and air concrete granules is used as said filling material.

In terms of apparatus, a very simple introduction of the filler for filling the annular space can be achieved if a one-component PU foam or a late-reacting two-component PU foam already mixed before entering into the supply duct is used as said filler.

A suitable procedure both in terms of introducing the supply duct into the sewer and in terms of filling the annular space with filler can be achieved by an embodiment of the method which is characterized in that the introduction of the supply duct is effected downhill and the removal of the supply duct under simultaneous filling of the annular space is effected uphill in the sense of the sewer ascent.

The introduction and removal slide provided within the scope of the invention, which advantageously may be utilized for introducing and returning the supply duct from the annular space present between the interior surface of the sewer and the inner pipe, is characterized in that the slide comprises two skids tightly interconnected by a web and a fixing means for the supply duct by which the supply duct may be fixed at approximately equal distances from the skids and substantially in parallel to the same. Here, it is possible to obtain good positioning properties within the sewer or within the annular space of the same, and the slide is adaptable without any difficulty to various inner pipe diameters by an appropriate design of the web, if it is provided for the web to be designed such that after fixation of the web on the supply duct, the distance between the skids is less the sum of the two distances between the respective skid and the supply duct. A design of the skids of the slides as rearwardly and forwardly pointed, elongate, tubular bodies makes it possible to attain a very good stability of the slide with a simple construction, and a slide designed in this manner is easy to produce. Such skids also sit well on the inner pipe and pass small obstacles without any problems as the slide moves.

Slides of the above-mentioned type are very easy to fix to the supply duct, e.g. by releasably attaching the web of the slide to the supply duct. In doing so it is suitable if the slide is fixed to the supply duct in the vicinity of the delivery nozzle.

The invention also relates to an introduction and removal arrangement comprising several slides of the above-indicated design, and such an arrangement is characterized in that several equal slides are fixed to the supply duct at pre-determined distances.

The invention will now be explained in more detail by way of examples and with reference to the rough schematic drawing figures.

In the drawings,

FIGS. 5a and 5b show cross-sections of two stages when lining a sewer according to a further embodiment of the method of the invention.

FIGS. 6a and 6b show a front view and a bottom view of an embodiment of a slide provided within the scope of the invention.

Figure 1A:
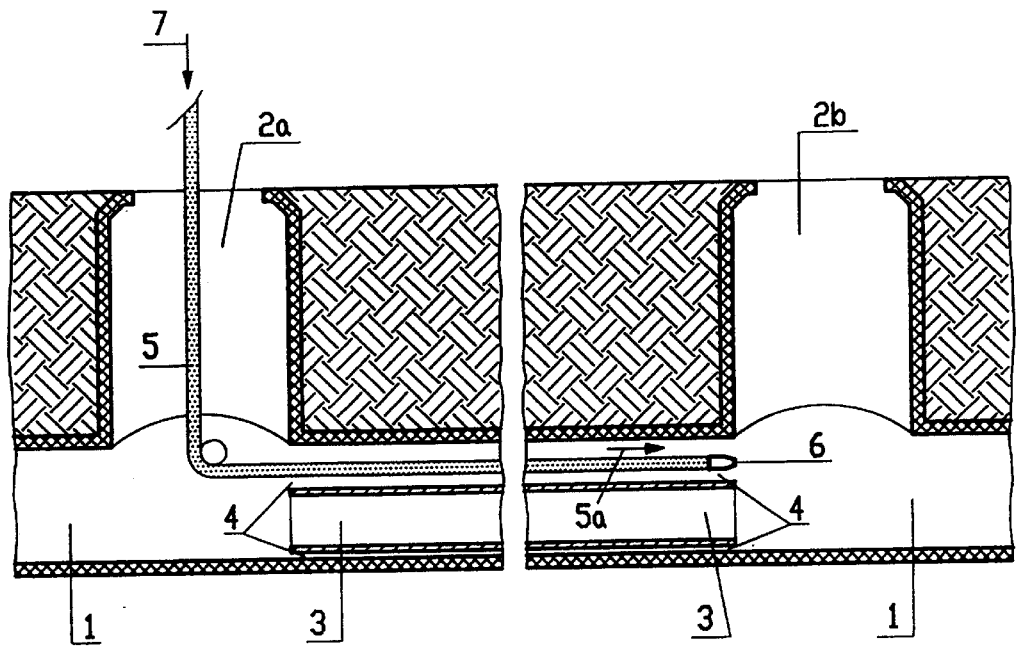
FIGS. 1a and 1b illustrate two stages of an embodiment of the method according to the invention.

In rough schematic illustration, FIG. 1a shows a longitudinal section of a sewer 1, equipped with manholes 2a, 2b leading to above ground, and to be provided with a lining. To form this lining, in the stage illustrated in FIG. 1a, an inner pipe 3 has already been inserted into the sewer 1. A supply duct 5 has been inserted into the annular space 4 present between the inner surface of the sewer 1 and the outer surface of the inner pipe 3, which supply duct has been advanced or pulled forward from the manhole 2a in the direction of arrow 5a and which is provided for introducing a filler into the annular space 4. The supply duct 5 schematically illustrated may comprise one or several pipes or hoses, depending on whether the filler 7 to be introduced into the annular space through the duct 5 consists of one or several components. At its exit end, the duct 5 is provided with a delivery nozzle 6. In the subsequent stage illustrated in FIG. 1b, the duct 5 is then removed again from the sewer 1 or from the annular space 4 formed in this sewer, by being withdrawn in the direction of arrow 5b. During this withdrawal movement, filler 7 is delivered into this annular space in an amount sufficient to completely fill the annular space 4. The filler 7 is a solidifying mass which is sufficiently strong to stably support the inner pipe 3 in the sewer 1, and which also has good sealing properties.

Figure 1B:
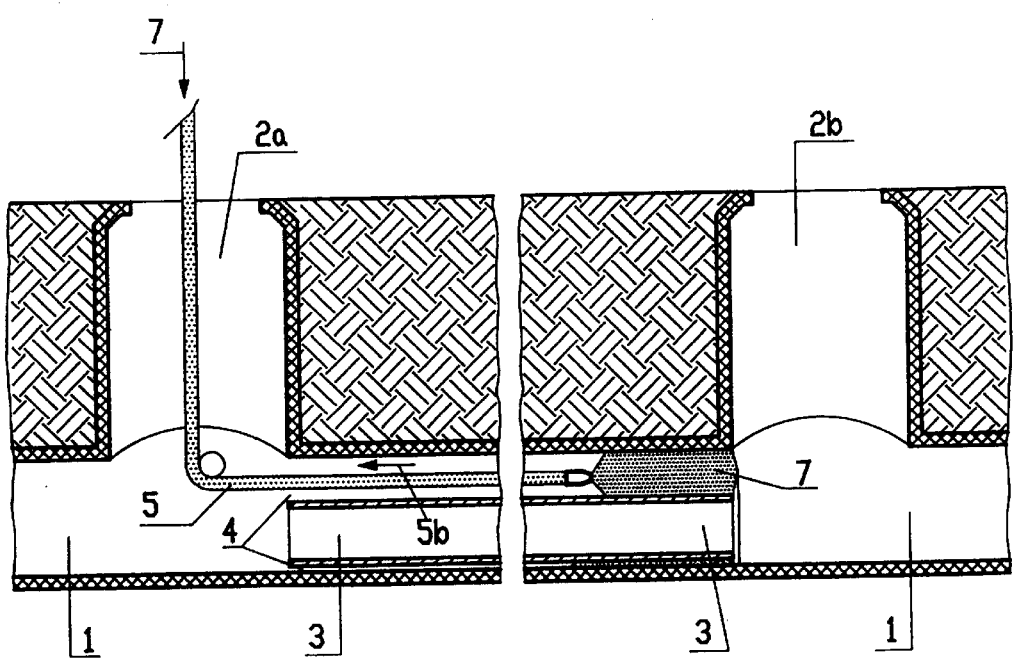
Figure 2:
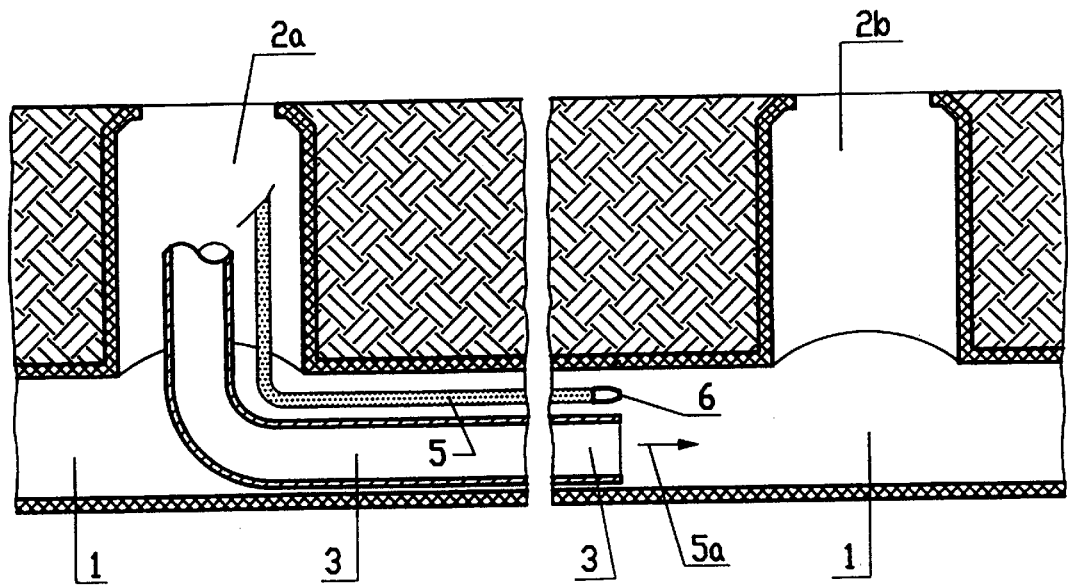
FIG. 2 illustrates a mode of procedure when introducing the inner pipe and the supply duct into a sewer to be lined.

FIG. 2 shows how the supply duct 5 for introducing filler into the sewer 1 to be lined is introduced together with the inner pipe 3 introduced into the sewer 1 for lining the same, according to one embodiment of the method of the invention. This introduction is effected by moving forward the inner pipe 3 and the supply duct 5 in the direction of the arrow 5a, and for this common advance movement it is advantageous as a rule if the supply duct 5 is releasably fixed to the inner pipe 3. As soon as the introduction procedure has been finished, such a fixation is released, and subsequently the annular space present between the inner surface of the sewer 1 and the outer surface of the inner pipe 3 is filled with filler analogously, as is shown in FIG. 1b.

Figure 3A:
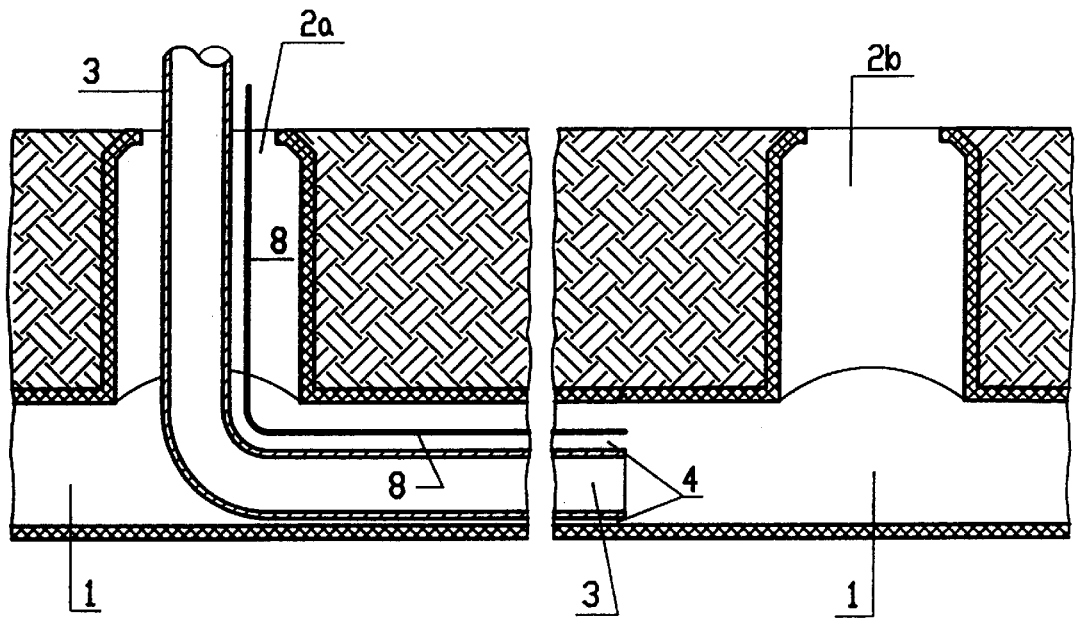
FIGS. 3a and 3b illustrate two stages when introducing the inner pipe and the supply duct according to another embodiment of the method of the invention.
Figure 3B:
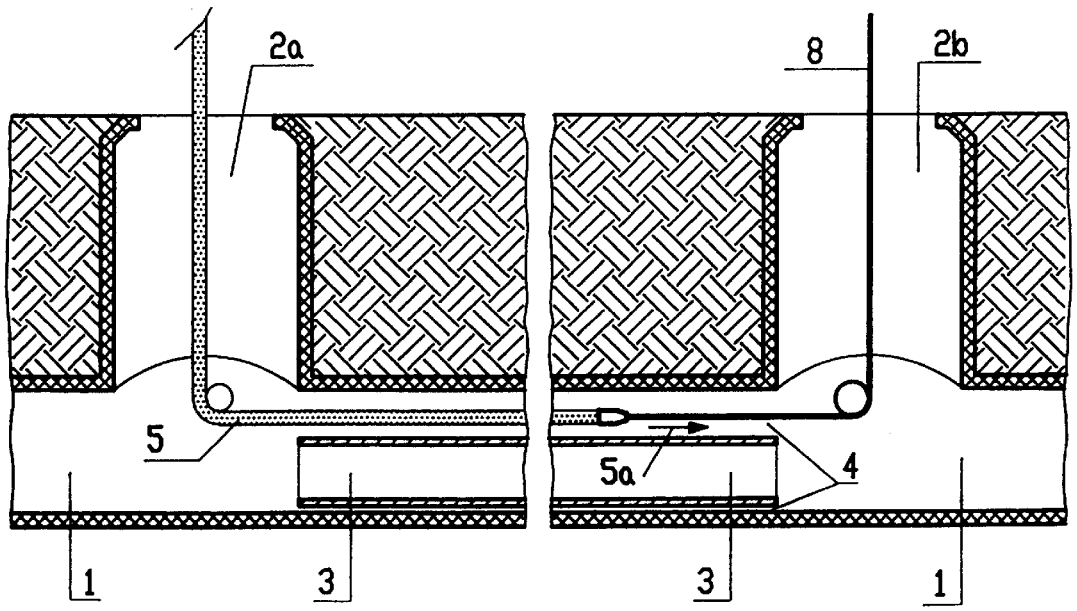

With the embodiment of the method of the invention illustrated in FIGS. 3a and 3b, an auxiliary rope 8 arranged at the outer surface of the inner pipe 3 is introduced into the sewer together with the inner pipe 3, when the inner pipe 3 is introduced into the sewer to be lined, this auxiliary rope passing through the annular space 4 formed between the inner pipe 3 and the inner surface of the sewer 1. In the subsequent phase, which is illustrated in FIG. 3b, the supply duct 5, as symbolized by arrow 5a, is introduced into the annular space 4 with the auxiliary rope 8 by pulling the latter outwards through the manhole 2b.

Figure 4:
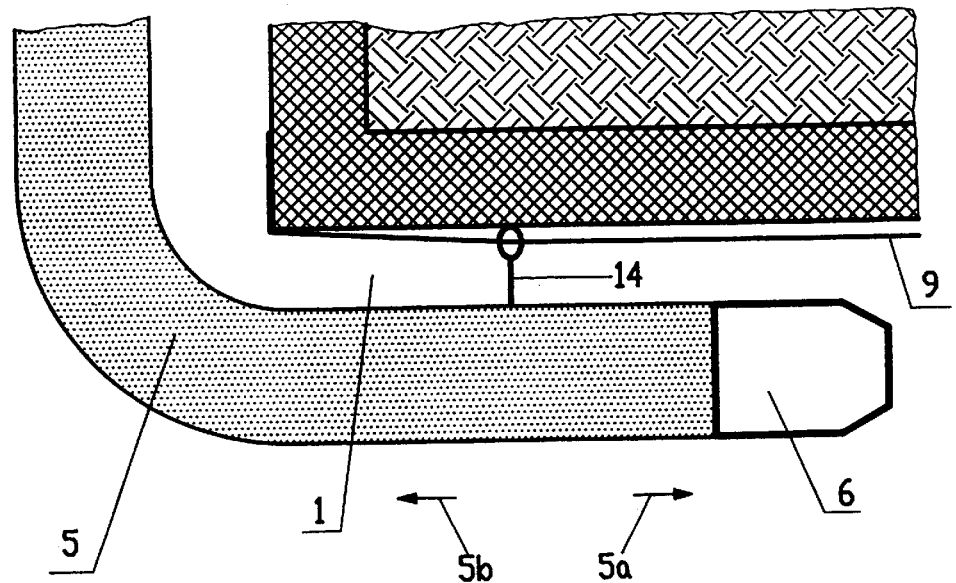
FIG. 4 illustrates a further mode of procedure when introducing the supply duct into a sewer to be lined; the above-indicated figures are longitudinal section representations.

FIG. 4 illustrates a further technique of introducing the supply duct 5, wherein a guide rope 9 is tensioned along the inner surface of the sewer 1, on which displaceable suspension means 14 are arranged to which the supply duct 5 is then fixed. By the guide formed in this manner, the supply duct 5 can be introduced easily and in a simple manner into the region of the sewer 1 to be filled with filler, in the direction of arrow 5a, and returned from this region in the direction of arrow 5b.

For a stable mounting of the inner pipe 3 in the sewer 1 and for filling the annular space 4 formed between the inner pipe 3 and the sewer 1 it is advantageous if the inner pipe is arranged towards the bottom of the sewer 1, as illustrated in more detail in FIGS. 5a and 5b, and thus an annular space 4 sickle-shaped in cross section results. In this case the supply duct 5, as illustrated by FIG. 5a, is guided as high as possible in the annular space 4 when it is introduced and particularly when it is removed in which latter instance the filler is introduced into the annular space 4, and in this way the annular space 4 is completely filled with filler 7 in a very simple manner, as is illustrated by FIG. 5b.

The embodiment of an introduction and removal slide illustrated in FIGS. 6a and 6b comprises two skids 12a, 12b interconnected by a web 13. This web 13 is formed by three struts 15, 16a, 16b, the struts 16a, 16b carrying a fixing means 17 to which the supply duct 5 carrying a delivery nozzle 6 at its end can releasably be attached. The web 13 is designed such that the distance 18 between the skids 12a, 12b is smaller than the sum of the two distances 19, 20 between the respective skid 12a or 12b, respectively, and the supply duct 5.

Figure 6C:
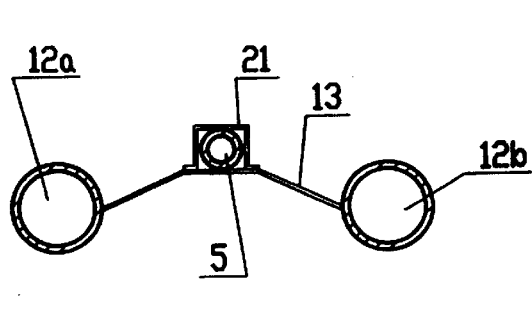
FIG. 6c shows a variant of such a slide in a front view.

In the embodiment of an introduction and removal slide illustrated in FIG. 6c, the two skids 12a and 12b are interconnected via an angled strut 13 carrying a holding shackle 21 in its middle by means of which the supply duct 5 can releasably be fastened to the slide.

Figure 7:
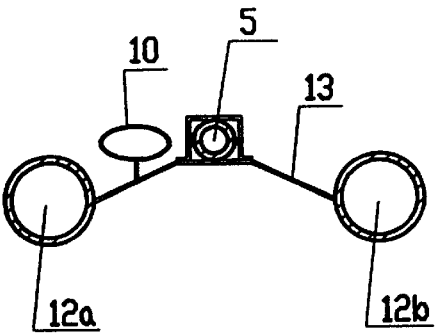
FIG. 7 shows another variant of such a slide, also in a front view.

With the embodiment of an introduction and removal slide illustrated in FIG. 7, whose construction is similar to the embodiment illustrated in FIG. 6c, a control means 10 is provided with which the introduction of filler into the sewer can be monitored, wherein such a control means, may, e.g., be formed by a small TV camera.

Figure 8:
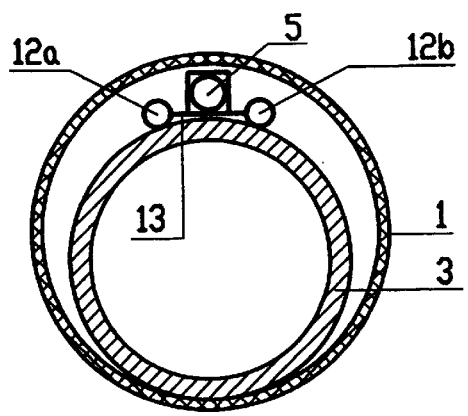
FIG. 8 shows a sewer to be lined and already provided with an inner pipe into which a slide as illustrated in FIG. 6c has been inserted.

FIG. 8 shows a sewer 1 in cross-section, an inner pipe 3 being introduced in the sewer and a supply duct carried by a slide 12a, 12b, 13, being guided in the annular space 4 between the inner pipe and the inner surface of the sewer 1 at the uppermost position. This guiding of the supply duct 5, i.e. of the delivery-side end thereof or of the delivery nozzle 6 provided at the delivery-side end of the supply pipe, enables complete filling of the annular space 4 with filler in a simple manner.

Figure 9:
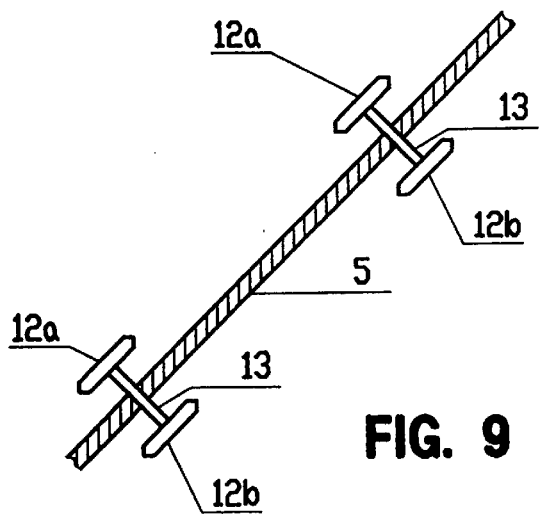
FIG. 9 shows a view of an embodiment of an introduction and removal means of the invention comprising several slides.

FIG. 9 illustrates an introduction and removal arrangement formed with several slides of the type illustrated in FIGS. 6a to 7, which introduction and removal arrangement is particularly advantageous if greater lengths of a supply duct 5 are to be guided. A number of slides formed by skids 12a, 12b and webs 13 are arranged at mutual distances and connected with the supply duct 5.

I claim:

1. A method of lining a substantially horizontally extending sewer comprising the steps of:

introducing simultaneously an inner pipe and at least one supply duct removably fixed to a leading edge of the inner pipe into a sewer until the inner pipe is located completely within the sewer; and filling the space between the outer surface of the inner pipe and the inner surface of the sewer with a filler delivered into the space by means of the at least one supply duct leading into the space;

wherein the step of filling further comprises the steps of:
   removing the at least one supply duct from its engagement with the inner pipe;
   removing the at least one supply duct by a withdrawing movement; and
   delivering the filler into the space in an amount sufficient to completely fill the space during the withdrawing movement of the at least one supply duct.

2. A method according to claim 1 wherein the removing step further comprises withdrawing the at least one supply duct above the inner pipe as high as possible in the space.

3. A method according to claim 1 wherein at least one slide, having a pair of elongate, tubular skids interconnected by a web is releasably attached to said at least one supply duct and wherein the removing step further comprises using the at least one slide to guide the supply duct through the space in a fixed orientation with respect to the inner pipe.

4. A method of lining a substantially horizontally extending sewer comprising the steps of:

introducing an inner pipe into a sewer; and filling the space between the outer surface of the inner pipe and the inner surface of the sewer with a filler delivered into the space by means of at least one supply duct leading into the space;

wherein the step of filling further comprises the steps of:
   guiding the at least one supply duct into the space by means of a guide so that the at least one supply duct extends over the entire longitudinal length of the inner pipe;
   removing the at least one supply duct by a withdrawing movement; and
   during the removal of the at least one supply duct, delivering the filler into the space in an amount sufficient to completely fill the space wherein the guide for guiding the at least one supply duct into the space is an auxiliary rope adjacent the outer surface of the inner pipe which is introduced into the space in the sewer together with the inner pipe, and wherein the at least one supply duct is subsequently guided into the space by the auxiliary rope.

5. A method of lining a substantially horizontally extending sewer comprising the steps of:

introducing an inner pipe into a sewer; and filling the space between the outer surface of the inner pipe and the inner surface of the sewer with a filler delivered into the space by means of at least one supply duct leading into the space;

wherein the step of filling further comprises the steps of:
   guiding the at least one supply duct into the space by means of a guide so that the at least one supply duct extends over the entire longitudinal length of the inner pipe;
   removing the at least one supply duct by a withdrawing movement; and
   during the removal of the at least one supply duct, delivering the filler into the space in an amount sufficient to completely fill the space wherein the guide for guiding the at least one supply duct into the space is a guide rope which is tensioned along the inner surface of the sewer, and wherein the at least one supply duct is suspended along the guide rope by at least one suspension means which is displaceable on the guide rope.

6. A method according to claim 4 wherein the guiding step further comprises guiding the at least one supply duct into the space starting at one end of the inner pipe and extending to the other end of the inner pipe.

7. A method according to claim 4 wherein the at least one supply duct comprises a pair of supply ducts, and wherein the guiding step further comprises guiding each supply duct into the space from an end of the inner pipe to the middle of the inner pipe, and wherein the removing step further comprises withdrawing each supply duct from the space from the middle of the inner pipe to the respective end of the inner pipe.

8. A method according to claim 4 wherein the guiding step further comprises guiding the at least one supply duct above the inner pipe as high as possible in the space, and wherein the removing step further comprises withdrawing the at least one supply duct above the inner pipe as high as possible in the space.

9. A method according to claim 4 wherein at least one slide comprising a pair of elongate, tubular skids interconnected by a web is releasably attached to said at least one supply duct, and wherein the guiding step further comprises using the at least one slide to guide the at least one supply duct into the space, and wherein the removing step further comprises using the at least one slide to withdraw the at least one supply duct from the space.

10. A method according to claim 5 wherein the guiding step further comprises guiding the at least one supply duct into the space starting at one end of the inner pipe and extending to the other end of the inner pipe.

11. A method according to claim 5 wherein the at least one supply duct comprises a pair of supply ducts, and wherein the guiding step further comprises guiding each supply duct into the space from an end of the inner pipe to the middle of the inner pipe, and wherein the removing step further comprises withdrawing each supply duct from the space from the middle of the inner pipe to the respective end of the inner pipe.

12. A method according to claim 5 wherein the guiding step further comprises guiding the at least one supply duct above the inner pipe as high as possible in the space, and wherein the removing step further comprises withdrawing the at least one supply duct above the inner pipe as high as possible in the space.

13. A method according to claim 5 wherein at least one slide comprising a pair of elongate, tubular skids interconnected by a web is releasably attached to said at least one supply duct, and wherein the guiding step further comprises using the at least one slide to guide the at least one supply duct into the space, and wherein the removing step further comprises using the at least one slide to withdraw the at least one supply dust from the space.

* * * * *